(12) United States Patent
Fabre et al.

(10) Patent No.: US 9,698,868 B2
(45) Date of Patent: Jul. 4, 2017

(54) POWER LINE COMMUNICATION DEVICE

(71) Applicant: eSMART Technologies SA, Ecublens (CH)

(72) Inventors: Laurent Fabre, Lausanne (CH); Lo Conte Fabrizio, Lausanne (CH); Andrew Watson, Ollon (CH)

(73) Assignee: eSMART Technologies SA (CH)

( * ) Notice: Subject to any disclaimer, the term of this patent is extended or adjusted under 35 U.S.C. 154(b) by 0 days.

(21) Appl. No.: 14/905,624

(22) PCT Filed: Jul. 22, 2014

(86) PCT No.: PCT/EP2014/065712
§ 371 (c)(1),
(2) Date: Jan. 15, 2016

(87) PCT Pub. No.: WO2015/011136
PCT Pub. Date: Jan. 29, 2015

(65) Prior Publication Data
US 2016/0156384 A1 Jun. 2, 2016

(30) Foreign Application Priority Data
Jul. 25, 2013 (CH) ........................... 1311/13

(51) Int. Cl.
*H04B 3/54* (2006.01)
*H04B 3/56* (2006.01)

(52) U.S. Cl.
CPC ................. *H04B 3/54* (2013.01); *H04B 3/56* (2013.01); *H04B 2203/5445* (2013.01); *H04B 2203/5458* (2013.01); *H04B 2203/5466* (2013.01)

(58) Field of Classification Search
CPC ..................... H04B 2203/5445; H04B 3/54
(Continued)

(56) References Cited

U.S. PATENT DOCUMENTS

| 6,693,803 B2 | 2/2004 | Beranger et al. |
| 2002/0063476 A1* | 5/2002 | Rolls ................. H05K 7/20581 307/117 |

(Continued)

FOREIGN PATENT DOCUMENTS

| EP | 1 300 965 A1 | 4/2003 |
| EP | 2290834 A1 | 3/2011 |

OTHER PUBLICATIONS

International Search Report and Written Opinion for PCT/EP2014/065712, dated Oct. 23, 2014, 8 pages.

*Primary Examiner* — Michael Neff
(74) *Attorney, Agent, or Firm* — Blank Rome LLP

(57) ABSTRACT

This invention focuses on a power line communication (PLC) device that is particularly suitable for Home automation systems and for solar panel systems. The device comprises a modem, a power supply to power said modem from an AC power line and a coupling device to communicate via the power line. The coupling circuit comprises a serial LC filter (C1, L1) and a shunt element (42). The shunt element (42) comprises a rectifier (21) that is connected to the power supply. The present invention provides a novel synergy between the coupling device and the power supply of the modem. The invention provides a power line communication device that is more compact and less expensive than conventional PLC devices.

11 Claims, 4 Drawing Sheets

(58) Field of Classification Search
USPC .......................................................... 375/257
See application file for complete search history.

(56) References Cited

U.S. PATENT DOCUMENTS

| | | | |
|---|---|---|---|
| 2006/0007614 A1* | 1/2006 | Pozzuoli | G06F 1/182 |
| | | | 361/62 |
| 2006/0044076 A1* | 3/2006 | Law | H04B 3/56 |
| | | | 333/124 |
| 2008/0258882 A1 | 10/2008 | Lester et al. | |
| 2010/0283391 A1* | 11/2010 | Braunshtein | H05B 37/0263 |
| | | | 315/127 |
| 2011/0164364 A1* | 7/2011 | Baum | H04B 3/542 |
| | | | 361/679.02 |
| 2012/0212064 A1* | 8/2012 | Spanoche | H02M 7/48 |
| | | | 307/82 |

\* cited by examiner

POWER LINE COMMUNICATION DEVICE

RELATED APPLICATIONS

This application is a national phase of PCT/EP2014/065712, filed on Jul. 22, 2014, which claims the benefit of Switzerland Application No. 01311/13, filed on Jul. 25, 2013. The entire contents of those applications are incorporated herein by reference.

FIELD OF THE INVENTION

The present invention concerns a power line communication device. This device is particularly suitable for home automation systems and for solar panel systems.

Todays, home automation extends the building automation providing control of home, home appliances, housework and household activities. In particular, electrical appliance automation provides control on home lighting, heating, cooking and on others home appliances. It further provides cost and efficiency surveys on these home appliances. Advantageously, electrical appliance automation devices could be installed directly behind the plug outlets in the home.

In today's panel solar systems, the trend is to integrate micro-inverters directly in the solar panel. These systems require a reliable communication between these micro-inverters in order to manage electrical parameters.

DESCRIPTION OF RELATED ART

Conventional power line communication devices generally comprise a modem whose coupling device and power supply are separately designed and implemented.

EP1300965 discloses a coupling apparatus for powerline transmission system with low bit rate. This document focus on a switch-controlled transformer and a control circuits performing both power supply and transmission of information. However the proposed solution optimizes the size and reduces the cost of the coupling device, this solution is limited to transformer-based galvanic isolated coupling and power supply devices.

BRIEF SUMMARY OF THE INVENTION

Respect to the prior art, an aim of the present invention is to provide a more compact and less expensive power line communication device.

Another aim of the present invention is to exploit more effectively the potential synergy between the coupling device and the power supply.

According to the invention, these aims are achieved by means of a power line communication device of claim 1.

In an embodiment according to the invention, the power line communication device comprises a modem, a power supply to power the modem from an AC power line, and a coupling circuit to couple the modem to the power line for transmitting and receiving of modulated data. The coupling circuit comprises a serial LC filter and a shunt element. The shunt element comprises a rectifier that is connected to the power supply.

In another embodiment, the capacitive circuit of the LC filter is connected to one terminal of the power line and a first terminal of the shunt element is connected to the second terminal of the power line.

In one embodiment, a second terminal of the capacitive circuit of the LC filter is further connected to a second terminal of the shunt element. In another embodiment, a second terminal of the capacitive circuit of the LC filter is further connected to a first terminal of the inductive circuit of the LC filter and a second terminal of the inductive circuit is connected to a second terminal of the shunt element.

In one embodiment, the AC power line is a single-phase line. In another embodiment, the AC power line is a three-phase line or a polyphase line.

In one embodiment, the rectifier is Half-wave or full-wave rectifier.

In one embodiment, the power line communication device further comprises a low pass filter.

In one embodiment, the power line communication device further comprises an electronic device and/or sensor. This electronic device and/or sensor is connected to the modem and provides to and/or receives data from the modem. In another embodiment, the power supply of the power line communication device supplies power to this electronic device and/or sensor.

In another embodiment, the power supply of the power line communication device supplies less than 100 watts.

Another aim of the present invention is to provide a reliable communication device for Home automation applications that could be installed directly behind the plug outlets of a home.

In one embodiment according to the invention, a Home automation system includes one or more of the above mentioned power line communication devices.

Another aim of the present invention is to provide a reliable communication device for solar panel systems that could be integrated directly into the panel inverter.

In one embodiment according to the invention, a photovoltaic solar panel system includes one or more of the above mentioned power line communication devices.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The invention refers to a power line communication (PLC) device. The power line communication device comprises a modem whose coupling device and power supply are designed in order to exploit common resources. The aim is to provide a power line communication device that is more compact and less expensive than conventionally PLC devices.

The power line communication (PLC) devices of the invention are particularly suitable for Home automation systems and for solar panel systems.

Home automation systems, in particular electrical appliance automation devices, that are destined to be installed directly behind the plug outlets of a home are highly size constrained devices. The power line coupling device and the power supply are the most challenging elements of such devices. A novel synergy between the coupling device and the power supply of the modem could provide a power line communication device that is more compact and less expensive than conventional PLC devices.

In today's panel solar systems, the trend is to develop micro-inverter to be integrated directly in the solar panel. Thus, a solar panel system requires reliable communication devices in order to connect a plurality of these inverters together and to manage its electrical parameters. A power line device of the invention is suitable to be integrated directly in these inverters, allowing such type of communication without any central unit, dedicated wires or radio interfaces.

Figure 1:
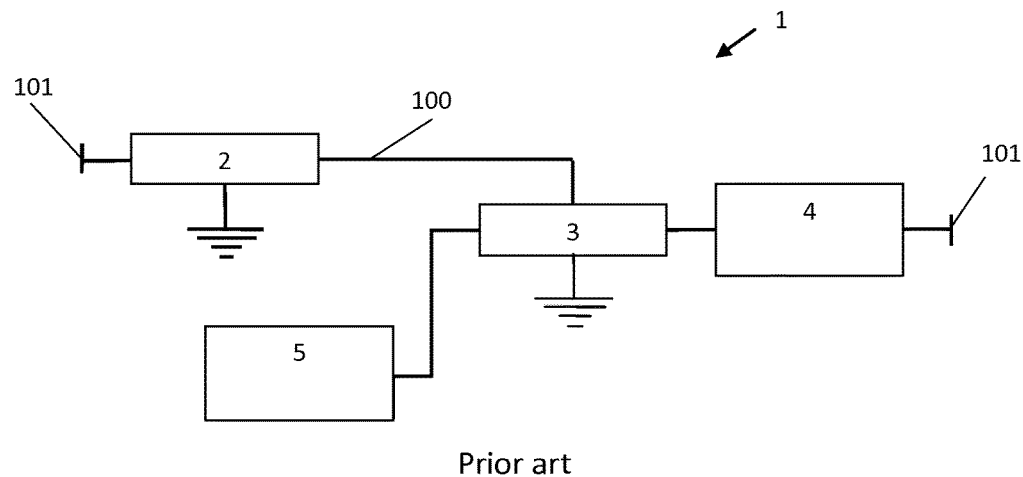
FIG. 1 represents schematically a known power line communication device.

FIG. 1 shows a conventional power line communication device 1. The PLC device 1 comprises a modem 3, a power supply 2 to supply the modem from the power line 101, a coupling device 4 to couple the modem 3 to the power line. The modem 3 is connected to at least an electronic device 5 that provides data to be sent and/or receives data via the power line 101 through the modem 3. The coupling device 4 and power supply 2 doesn't share common resources.

Figure 2:
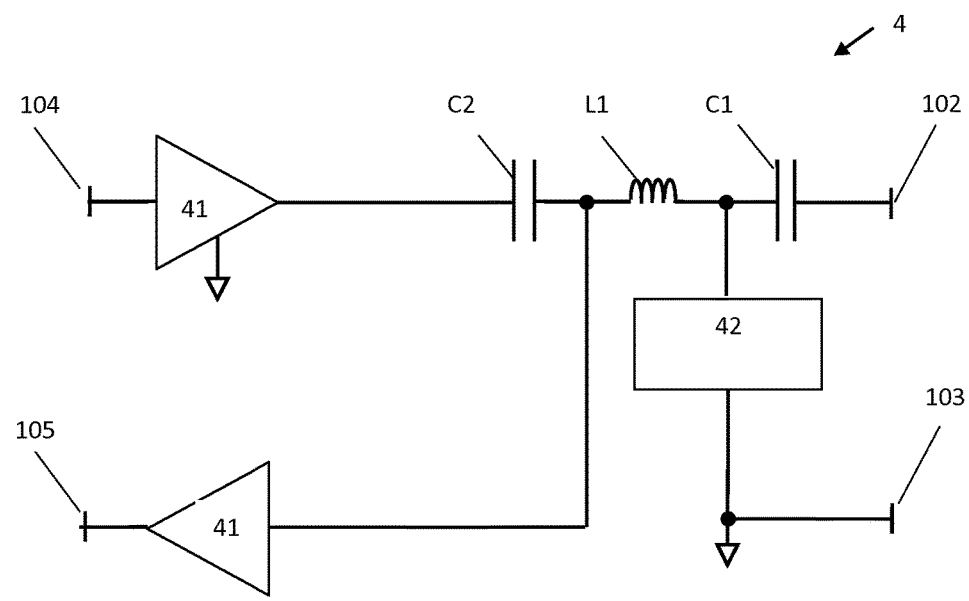
FIG. 2 shows a coupling device according to one aspect the invention.

FIG. 2 shows a coupling device 4 for a power line communication device 10 according to the invention. The coupling device 4 comprises a LC filter L1, C1, a shunt element 42 and a bi-directional, buffered port for connecting the data input/output terminals of the modem 3. A capacitor C2 could be used to remove the DC part from the output of the buffer 41 (that can be a fixed-gain buffer, a variable-gain buffer, or a unity-gain buffer, according to the circumstances). The shunt element 42 cooperates with the LC filter in order to realize a pass filter allowing the pass of the modulated data, while removing the power line carrier frequency.

Conventional coupling devices use simple resistor and/or inductance as shunt element.

Conventional galvanic-isolated coupling devices and power supplies integrate a transformer into theirs circuits, transformer that allows intrinsically to substitute the LC filter and shunt element.

A first terminal of the capacitor C1 of the LC filter could be connected to the Phase of the power line, while a first terminal of the shunt element 42 could be connected to the Neutral of the power line. A second terminal of the capacitor C1 could be further connected to a second terminal of the shunt element 42.

The coupling device 4 could also be used to couple a modem 3 to a Phase-Phase power line (e.g. three-phase electric power lines).

Figure 3:
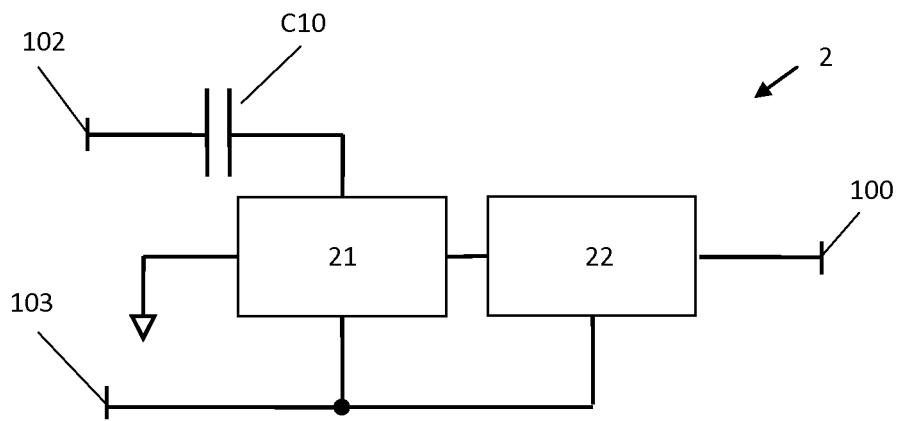
FIG. 3 shows a power supply circuit according to one aspect the invention.

FIG. 3 shows a power supply 2 for a power line communication device 10 according to the invention. The power supply 2 comprises a capacitor C10, a rectifier 21 and a low-pass filter 22. A first terminal of the capacitor C10 could be connected to the Phase 102 of a power line, while the second terminal is connected to a first terminal of the rectifier 21. A second terminal of the rectifier 21 could be connected to the Neutral 103 of the power line, while a third terminal could be connected to a low-pass filter 22. The rectifier 21 could be connected to Ground by a fourth terminal. The output of the low-pass filter provides the power supply 100 to the modem 3 and/or to others electronic devices 5.

A phase shift power supply could be used to power a low-power modem 3 and/or to others low-power electronic devices 5. The rectifier 21 could be a Full-Wave rectifier or a Half-Wave rectifier.

Figure 4:
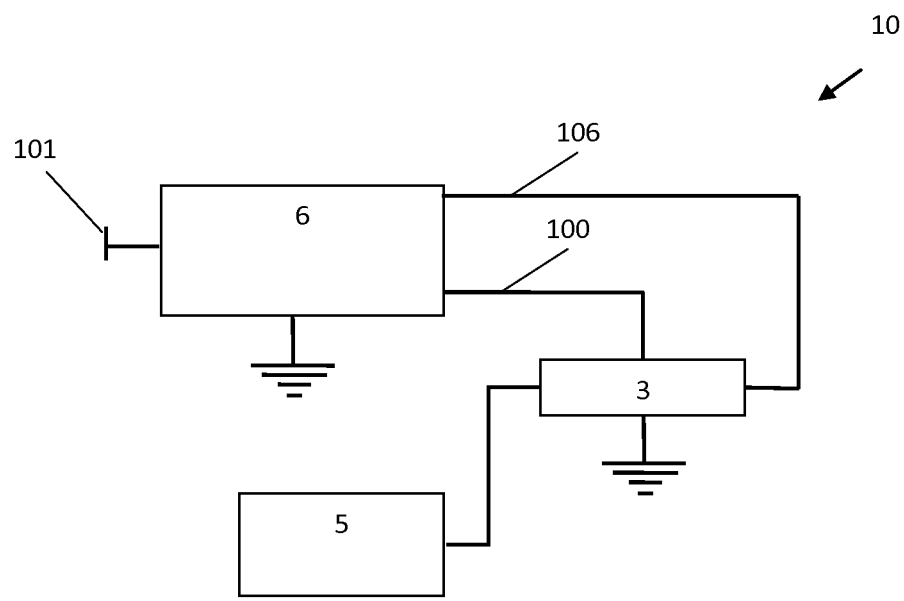
FIG. 4 represents schematically a power line communication device according to the invention.

FIG. 4 represents schematically a power line communication device 10 according to the invention. The power line communication device 10 comprises a modem 3, whose coupling device and power supply are designed in a single block 6 in order to exploit common resources. This leads to a power line communication device 10 that is more compact and less expensive than conventionally PLC devices.

Figure 5:
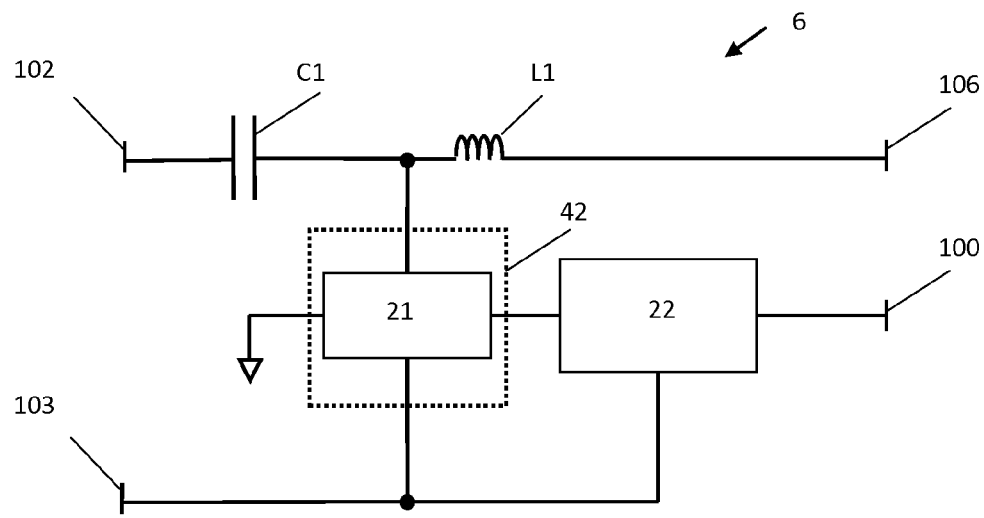
FIGS. 5 and 6 show the power supply and coupling device block of the power line communication device according to one aspect the invention.
Figure 6:
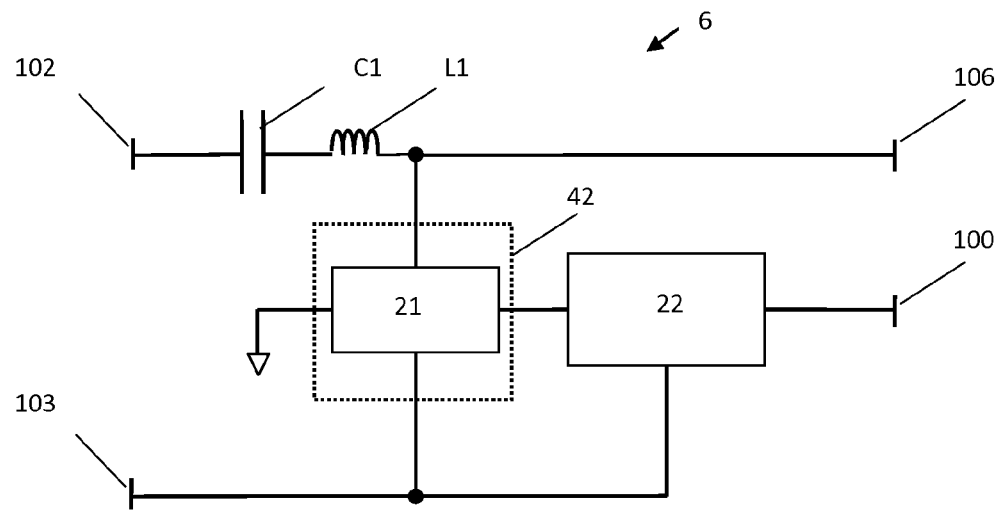

Two realizations of coupling device and power supply block 6 are shown in FIGS. 5 and 6. The coupling device and power supply block 6 comprises the LC filter C1, L1 and the shunt element 42 of the coupling device 4 as well as the capacitor, the rectifier 21 and the low-pass filter 22 of the power supply 2. A synergy between the coupling device and the power supply could be created, on one hand by sharing the same capacitor C1, and, on the other hand, by integrating rectifier 21 as sole element and/or main element of the shunt element 42 of the LC filter.

The electrical characteristics of the rectifier 21 have to be adapted to cooperate with the LC filter L1, C1 in order to remove the power line carrier frequency from the coupling device, while delivering the necessary power to the modem 3 and/or electronic device 5 through the capacitor C1 and the low-pass filter 22.

In FIG. 5, a first terminal of the capacitor C1 could be connected to the Phase 102 of the power line, while the second terminal is connected to a first terminal of the rectifier 21 and to a first terminal of inductance L1 of the LC filter. A second terminal of the rectifier 21 could be connected to the Neutral 103 of the power line, while the third terminal could be connected to a low-pass filter 22. The rectifier 21 could be connected to the Ground by a fourth terminal.

In the realization of FIG. 6, the second terminal of the capacitor 1 is connected to a first terminal of inductance L1 of the LC filter, while the second terminal of inductance L1 is connected to a first terminal of the rectifier 21.

Figure 7:
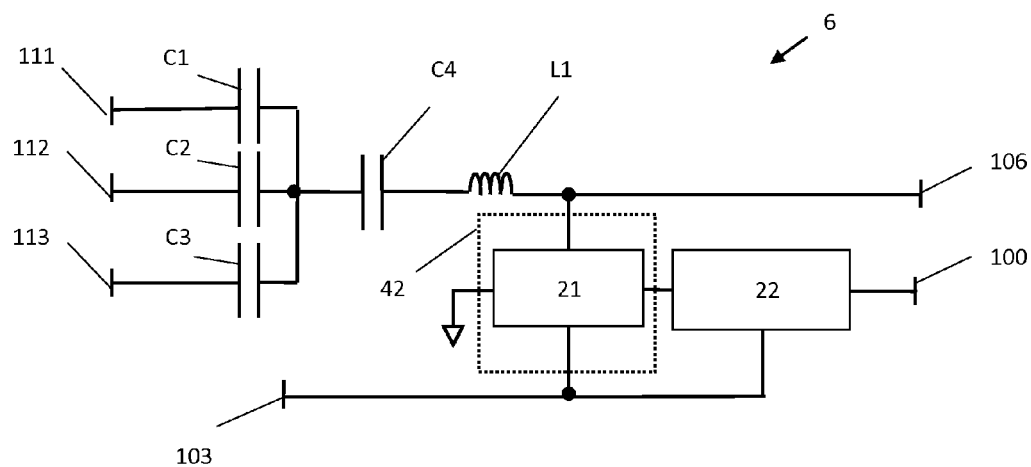
FIGS. 7 and 8 show the power supply and coupling device block of the power line communication device in a triphase configuration, according to one aspect the invention.
Figure 8:
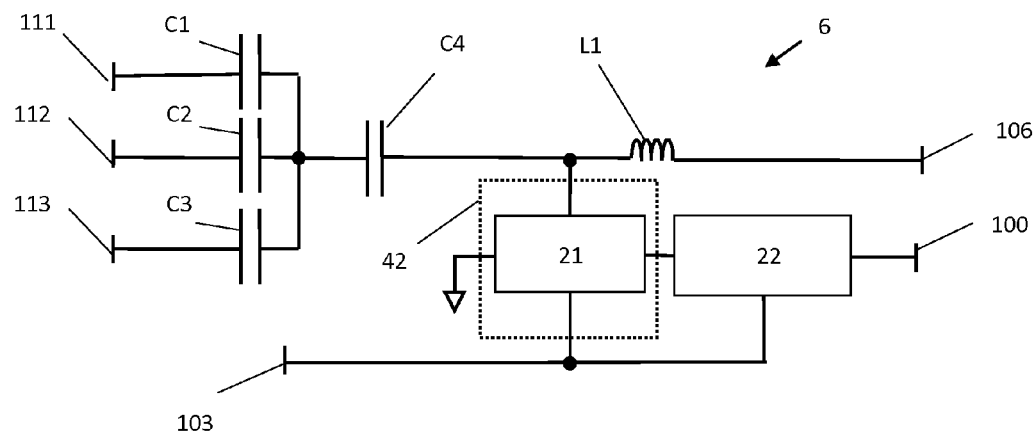

The FIGS. 7 and 8 show the power supply and coupling device block of the power line communication device in a triphase configuration.

In a multiphase or polyphase configuration, the LC filter could comprise a capacitive circuit and/or an inductive circuit. In FIGS. 7 and 8, such capacitive circuit comprises a plurality of capacitors C1, C2, C3 and C4.

Capacitor C4 could be used, if necessary, to set up the necessary circuit impedance.

LIST OF ELEMENTS USED IN DRAWINGS

1: Power line communication device (prior art)
2: Power supply
21: Rectifier
22: Low-Pass filter
3: Modem
4: Coupling device
41: Buffer
42: Shunt element
5: Electronic device and/or sensor
6: Power supply and coupling device block
10: Power line communication device
100: DC supply line 101: Power line
102: power line phase
103: power line neutral
104: modem OUT line
105: modem IN line
106: communication line
111: power line phase 1
112: power line phase 2
113: power line phase 3

We claim:

1. A Power Line Communication device comprising
a modem;
a power supply to power said modem from an AC power line; the power supply comprising a low-pass filter;
a coupling circuit to couple said modem to said power line for transmitting and receiving modulated data, wherein said coupling circuit comprises a shunt element and a serial LC filter; wherein said LC filter comprises a capacitive circuit and an inductive circuit: wherein said shunt element comprises a rectifier connected to the power supply;
wherein
a first terminal of the capacitive circuit of the LC filter is connected to one terminal of the power line and a first terminal of the shunt element is connected to a second terminal of the power line; and wherein
a terminal of the rectifier is connected to the low-pass filter for providing DC power supply to said modem.

2. The Power Line Communication device according to claim 1, wherein a second terminal of the capacitive circuit of the LC filter is further connected to a first terminal of the inductive circuit of the LC filter and wherein a second terminal of the inductive circuit of the LC filter is connected to a second terminal of the shunt element.

3. The Power Line Communication device according to claim 1, wherein the AC power line is a single-phase line.

4. The Power Line Communication device according to claim 1, wherein the AC power line is a three-phase line or a polyphase line.

5. The Power Line Communication device according to claim 1, wherein the rectifier is Half-wave or full-wave rectifier.

6. The Power Line Communication device according to claim 1, further comprising an electronic device and/or a sensor connected to the modem; wherein said electronic device and/or sensor provides to and/or receives data from the modem.

7. The Power Line Communication device according to claim 6, wherein the power supply supplies power to said electronic device and/or sensor.

8. The Power Line Communication device according to claim 1, wherein the power of generated by the supply is less than 100 watts.

9. A home automation system including one or more Power Line Communication devices according to claim 1.

10. A solar panel system including one or more Power Line Communication devices according to claim 1.

11. A Power Line Communication device comprising:
a modem;
a power supply to power said modem from an AC power line;
a coupling circuit to couple said modem to said power line for transmitting and receiving modulated data, wherein said coupling circuit comprises a shunt element and a serial LC filter; wherein said LC filter comprises a capacitive circuit and an inductive circuit; wherein said shunt element comprises a rectifier connected to the power supply;
wherein a first terminal of the capacitive circuit of the LC tilter is connected to one terminal of the power line and a first terminal of the shunt element is connected to a second terminal of the power line;
and wherein a second terminal of the capacitive circuit of the LC filter is further connected to a second terminal of the shunt element.

* * * * *